United States Patent [19]
Taylor

[11] Patent Number: 6,014,876
[45] Date of Patent: Jan. 18, 2000

[54] ADJUSTABLE LOCKING FOR HOOD LATCH

[75] Inventor: Steven Michael Taylor, Birmingham, Mich.

[73] Assignee: Ford Global Technologies, Inc., Dearborn, Mich.

[21] Appl. No.: 09/224,984

[22] Filed: Jan. 4, 1999

[51] Int. Cl.[7] .................................................. B60R 25/00
[52] U.S. Cl. .............................. 70/240; 70/451; 70/370; 70/417; 292/346; 292/DIG. 14
[58] Field of Search ............................ 70/240, 341, 370, 70/371, 416, 417, 451, 448; 292/DIG. 14, 43, 53, 54, 337, 346

[56] References Cited

U.S. PATENT DOCUMENTS

| | | | |
|---|---|---|---|
| 2,832,621 | 4/1958 | Orlow | 292/52 |
| 2,948,141 | 8/1960 | Vahlstrom | 70/370 |
| 3,309,904 | 3/1967 | Niilola | 70/370 X |
| 3,315,502 | 4/1967 | Skrapits et al. | 70/240 |
| 3,392,557 | 7/1968 | Solow | 70/240 |
| 3,868,836 | 3/1975 | LaRoche | 70/240 |
| 3,964,280 | 6/1976 | Kelton | 70/370 X |
| 3,966,242 | 6/1976 | Vitalis | 292/DIG. 14 X |
| 4,054,309 | 10/1977 | Borlinghaus | 292/216 |
| 4,113,294 | 9/1978 | Bierman | 292/346 |
| 4,212,176 | 7/1980 | Hegedus | 70/417 |
| 4,381,656 | 5/1983 | Hayakawa | 70/370 X |
| 4,441,345 | 4/1984 | Guarr | 70/240 |
| 4,456,289 | 6/1984 | Badiali | 292/28 |
| 4,492,101 | 1/1985 | Tanaka | 70/370 |
| 4,628,300 | 12/1986 | Amato | 292/346 X |
| 4,671,548 | 6/1987 | Haberle et al. | 70/240 X |
| 4,873,852 | 10/1989 | Neyret | 70/370 X |
| 4,917,417 | 4/1990 | Aubry | 292/DIG. 14 X |
| 5,172,946 | 12/1992 | Dowling | 292/337 X |
| 5,431,460 | 7/1995 | Hass et al. | 292/DIG. 14 X |
| 5,477,712 | 12/1995 | Hill | 70/417 |
| 5,529,355 | 6/1996 | Fukumoto | 292/337 |
| 5,551,268 | 9/1996 | Carnes et al. | 70/370 |
| 5,709,420 | 1/1998 | Umino | 292/337 X |
| 5,894,749 | 4/1999 | Tomaszewski et al. | 70/240 |

Primary Examiner—Suzanne Dino Barrett
Attorney, Agent, or Firm—Joseph W. Malleck

[57] ABSTRACT

A tamper-proof locking mechanism for a vehicular engine compartment, the compartment having a (a) hood closure member with a striker secured within the compartment to the hood; (b) a latch mechanism having a movable latch for catching and holding the striker when such striker is brought into a predetermined position relative to compartment; (c) a bracket secured or connected to the other closure member having (i) walls secured to the latch mechanism for fixing such mechanism in a desired spatial position for receiving the striker, (ii) a saddle with spaced walls defining a track closed at one end by the saddle; and (d) a lock having a housing provided with (i) a tumbler body slidable in and along the track and nestable on the saddle for being secured in an operative position, (ii) housing flanges at opposite regions of the body that overlap the edges of both of the spaced saddle walls, each flange contacting the edges of the side walls at one end of the body to ride thereon and fit flush thereagainst as well as stabilize the body in the track and prevent the tumbler body from being pulled out or pushed in, and (iii) a pair of ears extending from the body to fit flush with the interior of the respective track walls and prevent twisting of the body therein.

7 Claims, 7 Drawing Sheets

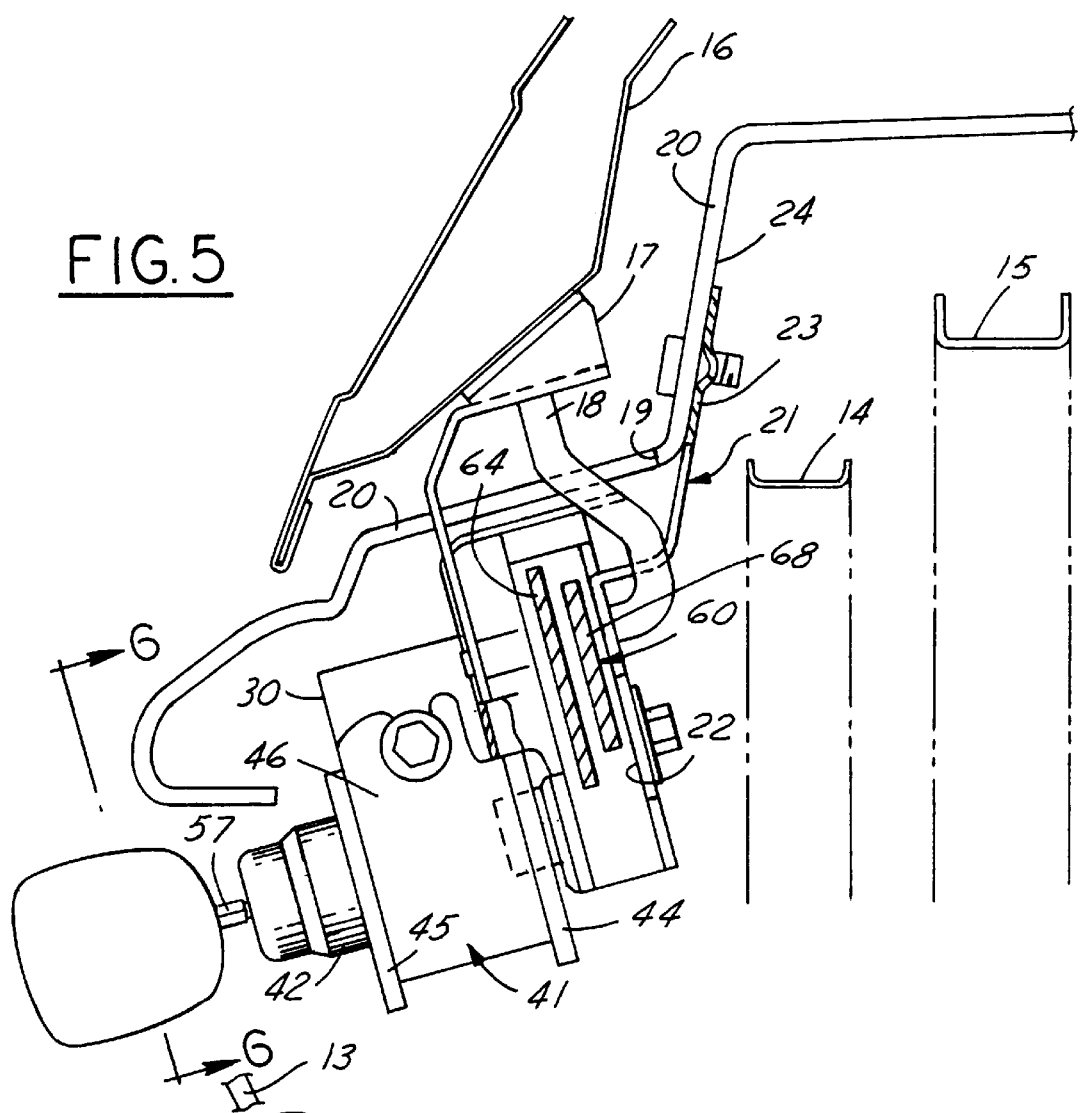
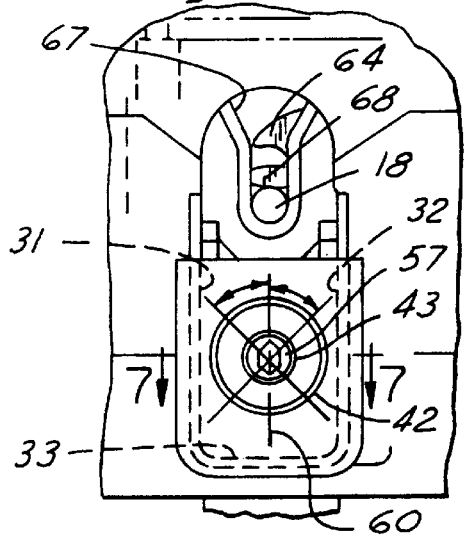
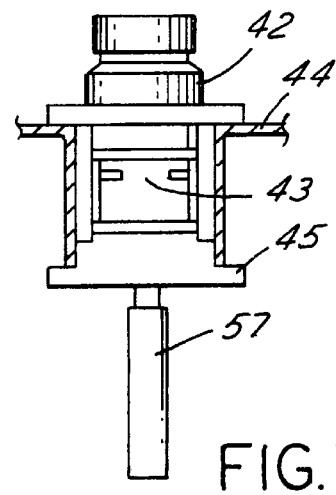

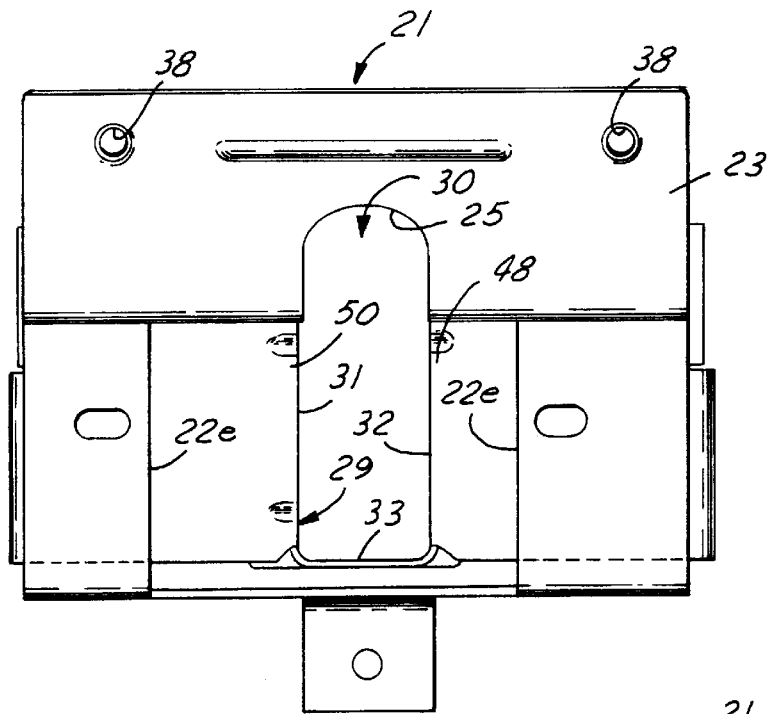
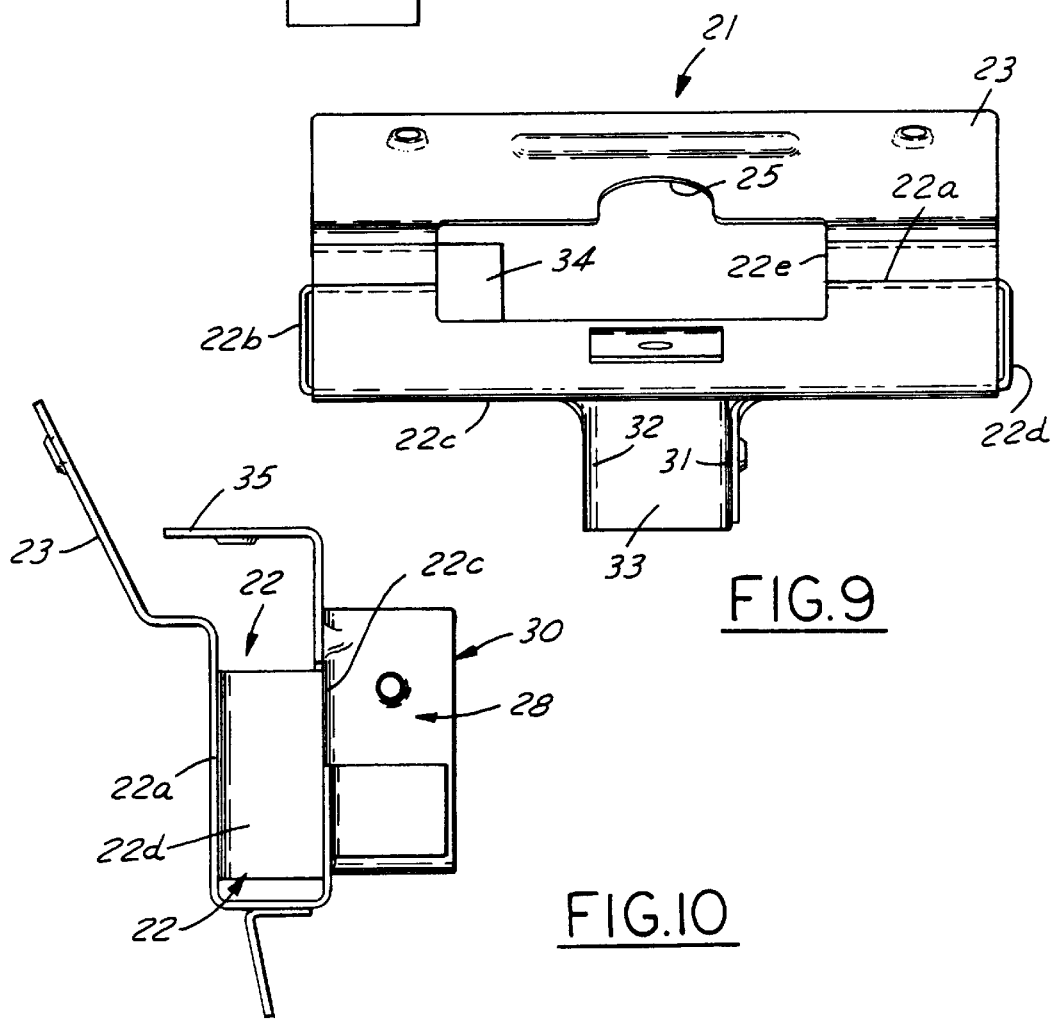

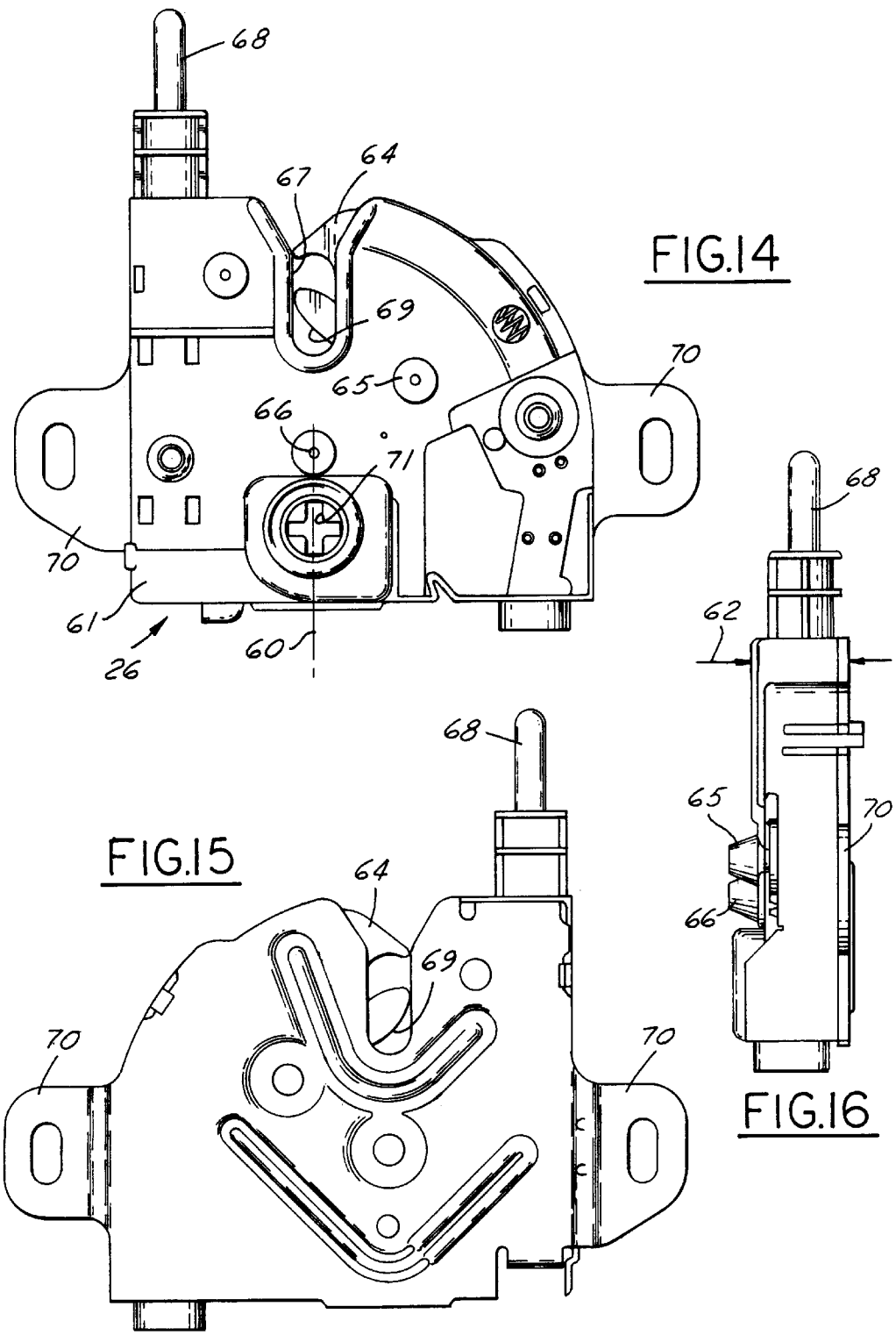

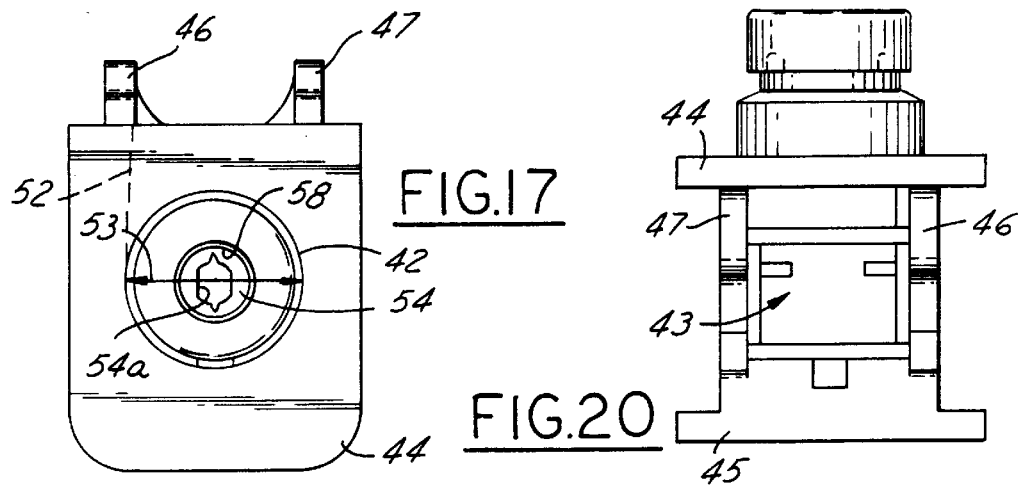
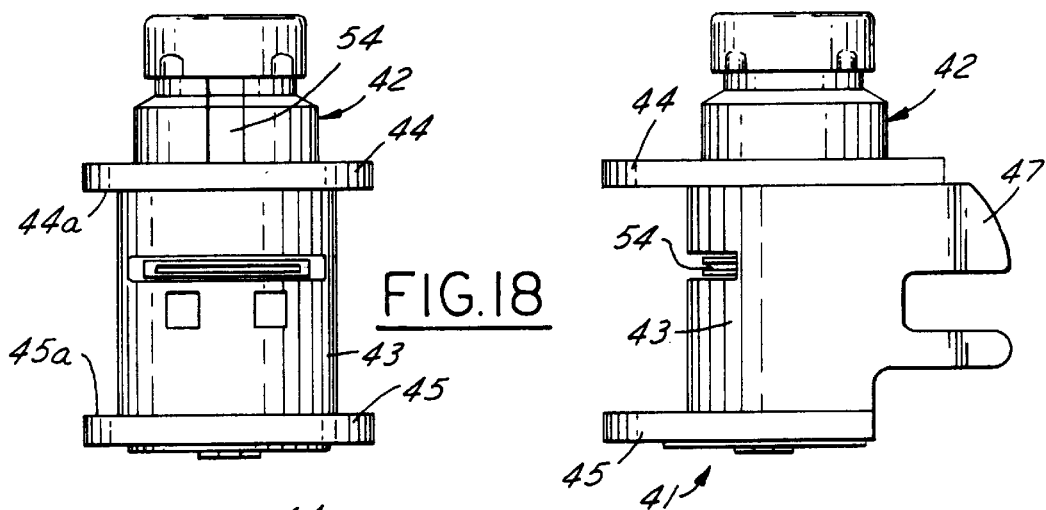
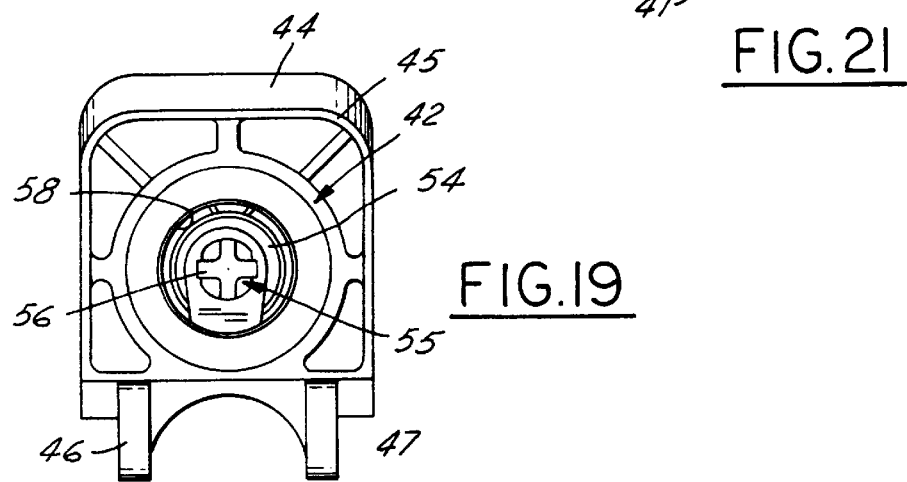

6,014,876

ADJUSTABLE LOCKING FOR HOOD LATCH

FIELD OF THE INVENTION

This invention relates to the technology of providing tamper-proof locking systems for special vehicle compartments, such as an engine compartment closed by a hood panel pivotal about an axis adjacent the windshield of a vehicle.

BACKGROUND OF THE INVENTION

Engine compartment security has become a high priority for auto owners and auto insurance companies as well as auto manufacturers. Hood latch systems have typically been used without any locking mechanism that would prevent forced entry. A conventional hood latch apparatus uses a cable release system with a cable handle located in the driver compartment of the vehicle(see U.S. Pat. No. 2,832,621). Sometimes the cable handle includes a lock on the handle (see U.S. Pat. No. 4,456,289). However, security effectiveness of the cable release design is dependent upon the degree of shielding of the cable from theft, which has proven to be difficult and expensive.

Other approaches to engine compartment security have used locks installed directly on the hood latch in lieu of the cable; but such approaches have failed to provide a tamper-proof mechanism because elements of the lock or latch are accessible through openings in the vehicle grill or the lock itself can be destroyed (see U.S. Pat. Nos. 4,441,345 and 3,315,502). It has been found to be a relatively simple matter to either drive the lock tumbler through the lock housing or through the supporting sheet metal, or to use a slam puller tool to pull the lock mechanism or tumbler out of the lock housing or sheet metal support. With the lock mechanism or tumbler displaced, it leaves a hole in the closure panel; a long tool can be inserted through the hole to actuate the latch, which is no longer protected by the lock. Alternatively, a thief may force an opening in the adjacent sheet metal next to the lock and either wedge apart a coupling between the lock and latch or twist and bend away the bracket protecting the latch or lock to permit release of the latch. No matter which means of forced entry is used, an important criteria, as far as the would-be thief is concerned, is that it should take no longer than several minutes to accomplish the break-in, such as 2–3 minutes. The risk of being caught in the act obviously greatly increases with every moment spent in the break-in.

SUMMARY OF THE INVENTION

It is an object of the present invention to provide a lock and latch assembly which is more theft-proof than existing assemblies and is more tamper-proof (prevent use of slam puller, hammer and chisel, or removal by twisting). It is also an object of this invention to provide a tamper-proof construction that is easy to assemble and provides adjustability during such assembly.

The invention which meets the above objects comprises a vehicular compartment locking mechanism that is adapted for a compartment that has a first and second closure member that comes together in relatively close fitting relationship. The mechanism comprises: (a) a striker secured within the compartment to one closure member; (b) a latch mechanism having a movable latch for catching and holding the striker when such striker is brought into a predetermined position relative to the other closure member; (c) a bracket secured or connected to the other closure member having (i) walls secured to the latch mechanism for fixing such mechanism in a desired spatial position for receiving the striker, (ii) a saddle with spaced walls defining a track closed at one end by the saddle; and (d) a lock having a housing provided with (i) a tumbler body slidable in and along the track and nestable on the saddle for being secured in an operative position, (ii) housing flanges at opposite regions of the body that overlap the edges of both of the spaced saddle walls, each flange contacting the edges of the side walls at one end of the body to ride thereon and fit flush thereagainst as well as stabilize the body in the track and prevent the tumbler body from being pulled out or pushed in, and (iii) a pair of ears extending from the body to fit flush with the interior of the respective track walls and prevent twisting of the body therein.

BRIEF DESCRIPTION OF THE DRAWINGS

FIG. 5 is an enlarged sectional elevational view of the latch and lock assembly of FIG. 1, taken along line 5—5 thereof, illustrating the assembly as installed on a vehicle to lock the hood panel and front grill opening panel of an engine compartment;

FIG. 6 is a view taken along line 6—6 of FIG. 5;

FIG. 7 is a sectional view taken along line 7—7 of FIG. 6;

FIGS. 8–13 are, respectively, rear, bottom, left side, top, front, and right side elevational views of the bracket element;

FIGS. 14–16 are front rear and side elevational views of the latch mechanism; and FIGS. 17–21 are, respectively, front, top, rear, bottom, and side elevational views of the lock element.

DETAILED DESCRIPTION AND BEST MODE

Figure 1:
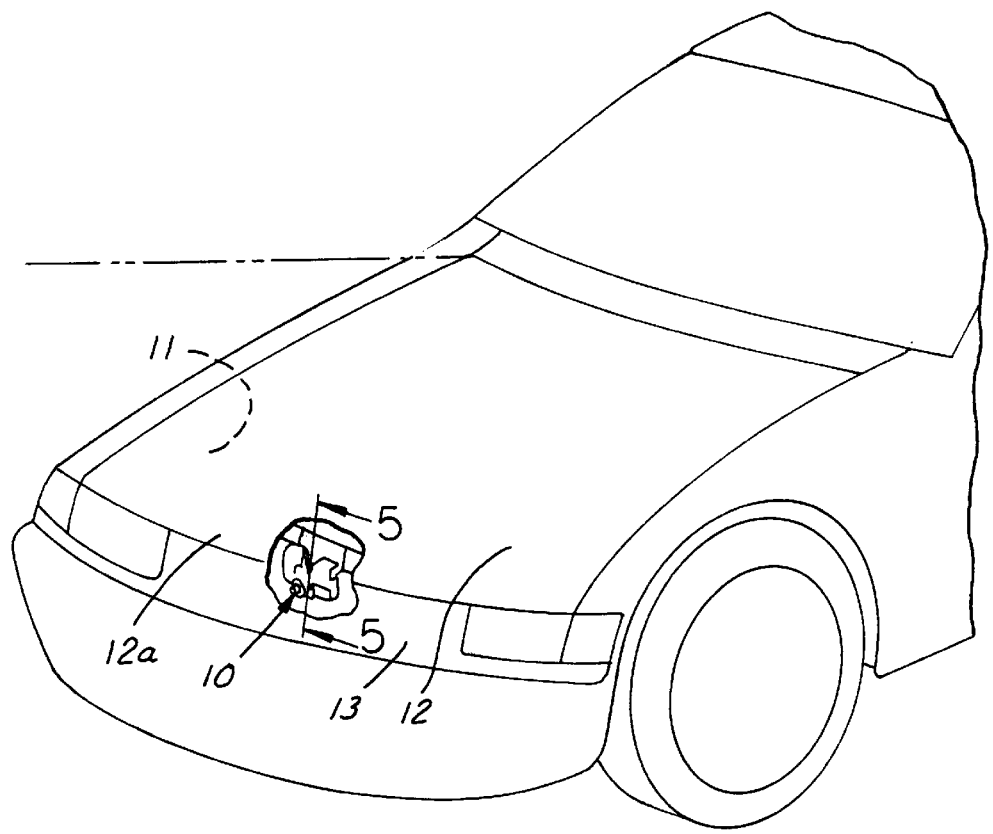
FIG. 1 is a perspective view illustrating the auto environment for the assembly of this invention.
Figure 2:
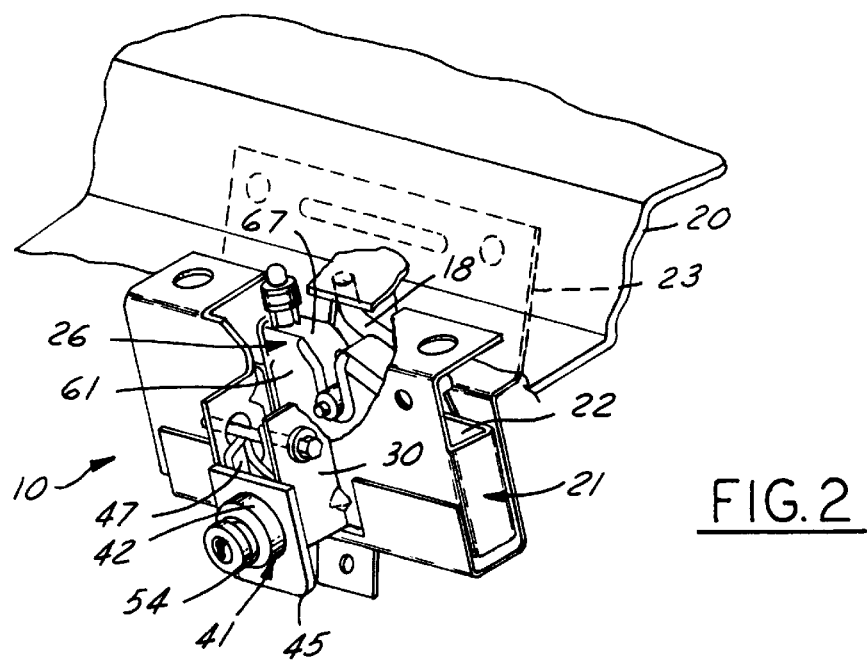
FIG. 2 is an enlarged view of the assembly of FIG. 1.
Figure 3:
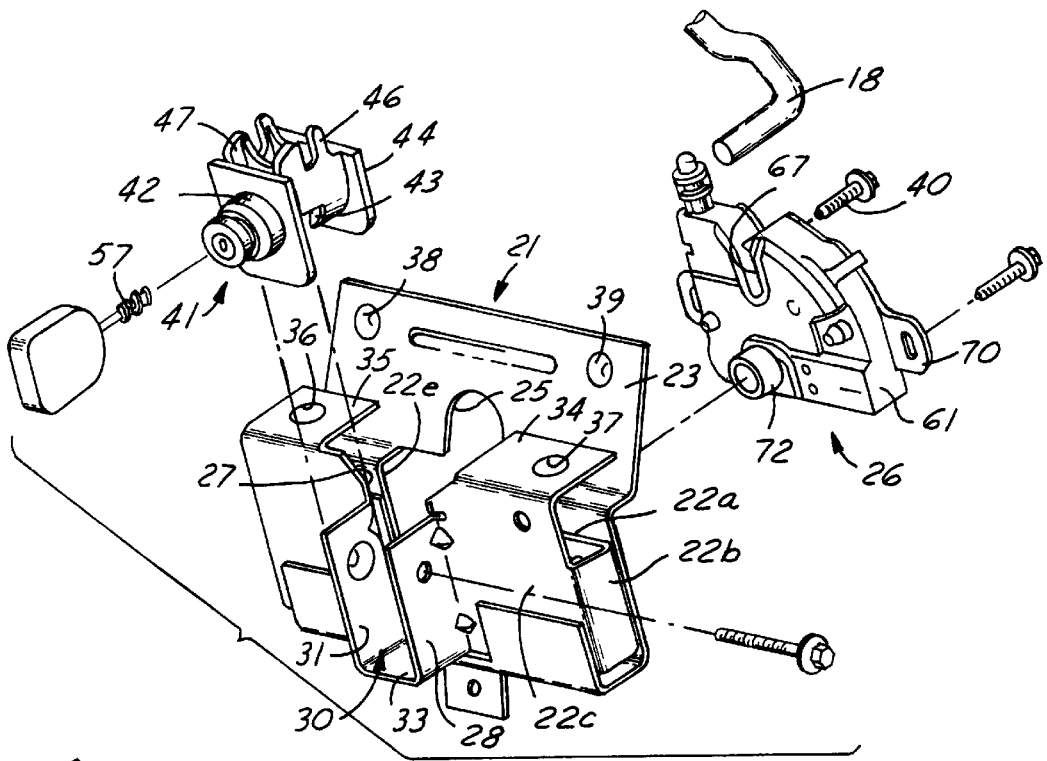
FIG. 3 is an exploded perspective view of the lock and late assembly of FIG. 2.
Figure 4:
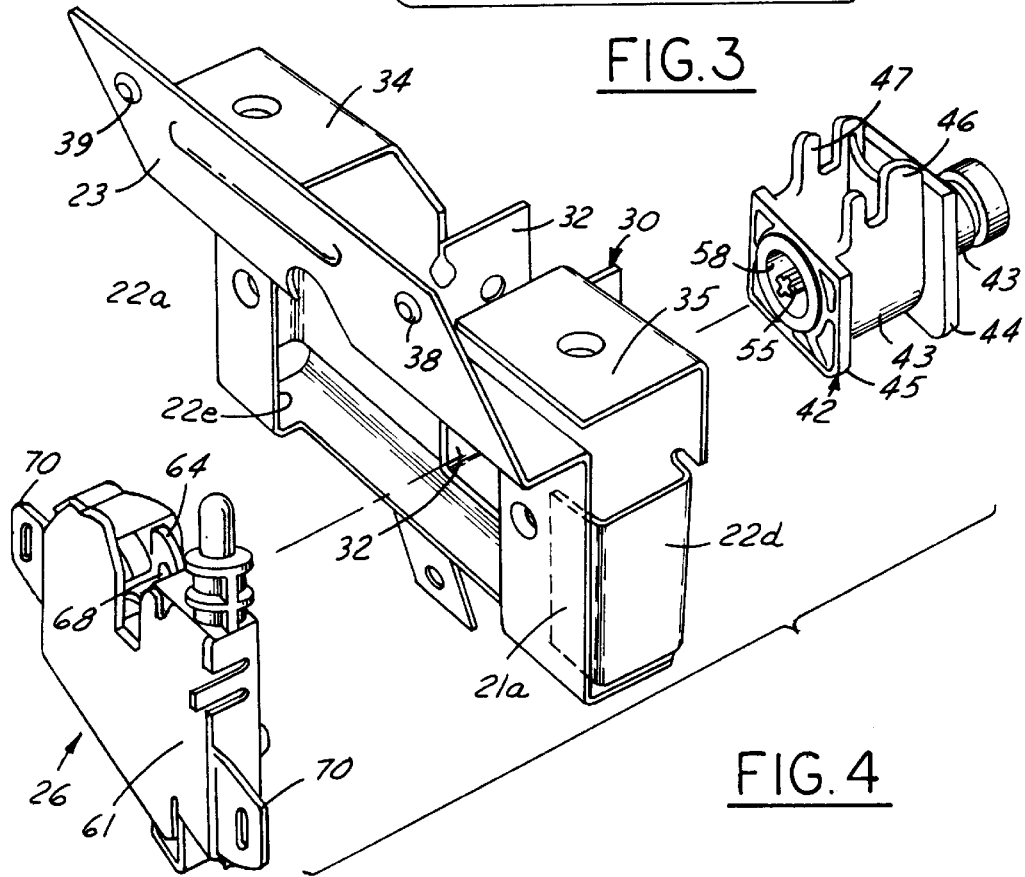
FIG. 4 is another exploded perspective view of the bracket, lock and latch mechanisms taken from a different viewpoint.
Figure 12:
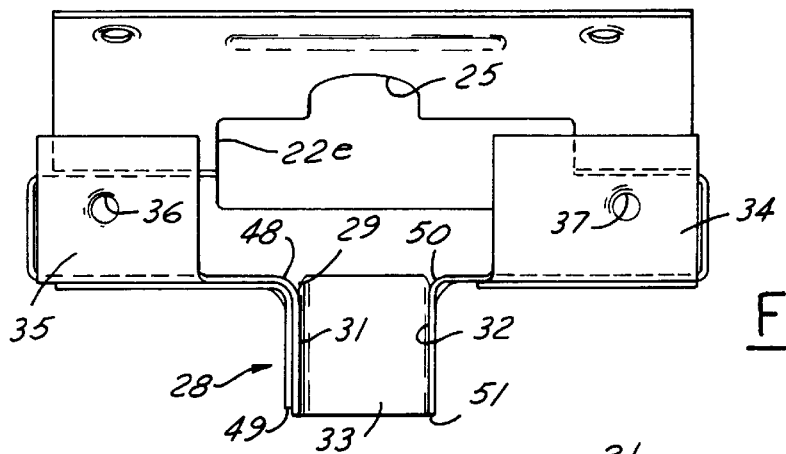
Figure 11:
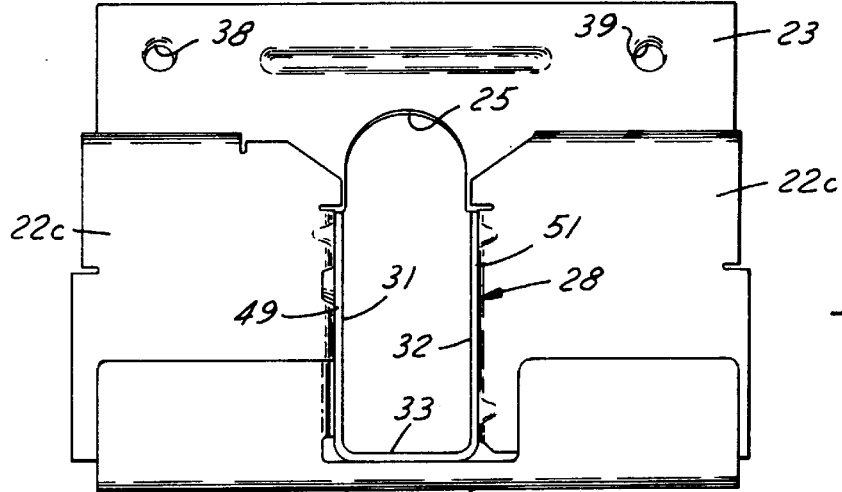
Figure 13:
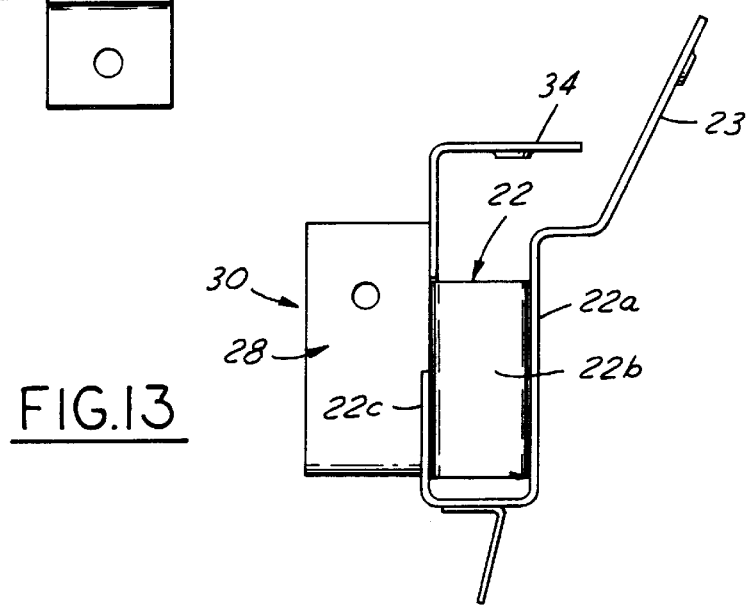

The tamper-proof vehicular compartment locking mechanism 10 is shown as applied to protecting an engine compartment 11 extending forward of a vehicular windshield (not shown) and closed by a hood panel 12 (a first closure member) which may pivot about an axis close to the windshield. The front 12a of the hood panel is usually designed to close adjacent a grill opening panel 13 (another closure member) that allows air flow around condenser 14 and radiator 15 element (see FIG. 5) sitting forward in the engine compartment 11. An inner wall 16 of the hood panel carries a support bracket 17 to which is rigidly and strongly secured a depending striker or hasp 18 that extends down and through a narrow opening 19 in a radiator support 20 integrated with the grill opening panel 13. A latch bracket 21 (carrying a cup 22 and a saddle 30) is rigidly connected to the underside of the radiator support 20. Such latch bracket 21 receives a lock 41 (having shielding walls 44, 45 that allow it to slide down into and along the side walls 31, 32 or saddle 30) and latch mechanism 26 that tilts up and into the cup 22 through rear openings in the bracket to receive the lock and to operatively latch with the striker or hasp 18.

The specially formed bracket 21 being attached to the underside of the radiator support 20, has a wall 23 meeting flush with an angled wall 24 of the radiator support 20 (FIG. 5). The upright cup 22 is offset and depends from the wall 23. The cup 22 is configured by surrounding walls 22a, 22b, 22c, and 22d. Rear wall 22a has an opening 22e, and the wall 23 is further notched at 25 to allow for insertion of a latch mechanism 26 into the cup. The forward wall 22c is also notched at 27 in a manner to align (front to back) with the rounded notch 25 in the angled wall 23. U-shaped walls 28 extend from the edges 29 of the notch 27 to define a saddle 30 having flat, upright interior walls 31, 32, and bottom wall 33, that closes the bottom of the "U". The bracket 21, cup 22, and saddle 30 may be formed of two, stamped sheet metal plys as shown welded at overlapping margins 21a. The wall 22c has spaced flanges 34, 35 turned over at the top of the cup. Openings 36, 37 in the flanges, as well as openings 38, 39 in wall 23, permit bolts 40 to extend therethrough to secure the latch bracket 21 to the angled wall support 24.

Lock 41 has a housing 42, which is comprised of a tumbler body 43, a pair of transverse flanges or shielding walls 44, 45, and a pair of upright, flat ears 46, 47 that meet flush with the interior walls 31, 32 to prevent twisting. The tumbler body 43 is slidable in and along the interior walls 31, 32 of the saddle (which defines a track). The body 42 nests against the bottom wall 33 of the saddle, thereby securing the body 42 in an operative position.

Housing flanges 44 and 45 reside at opposite ends or regions of the tumbler body to overlap laterally the edges of the side walls 31, 32, and 33. The interior portions 44a and 45a of flanges 44, 45 (see FIG. 18) are dimensionally spaced to ride flushly on such edges 48, 49, 50, and 51 of the bracket 21 as the housing is lowered in the saddle or when the housing is raised to permit vertical adjustment. Flanges 44, 45 stabilize the body in the track or saddle and thereby prevent the tumbler body from being pushed in or pulled out. The upright, flat ears 46, 47 are integrated to the body 43 and extend as chords or tangents 52 from a diameter 53 of the body (FIG. 17) to fit flush with the interior of the walls 31, 32.

The tumbler body 42 receives a cylindrical tumbler assembly 54 that will turn a crank arm 55 (having a cross sectional shape in the form of a cross 56) when a coded key 57 is inserted into opening 54a of the tumbler assembly 54 to adjust the tumbler in a manner to be able to turn within the receptacle 58 of the body 43.

Latch mechanism 26 may be of the type that has a housing 61 with a narrow thickness 62. It has a primary latch 68 and a secondary latch 64, both of which rotate about their respective support axes 65, 66 to permit the striker 18 to pass down and into the latch slot 67 when the hood panel 12 is swung down into a closing position. A release finger 68 is resiliently depressed during such closing, which becomes helpful to push the hood back up into an ajar position when the primary latch 68 is released by turning the key 57 to the left (FIG. 6). During the first rotary movement of key 57 to the left to unlock, the primary latch is released and urged by a spring to rotate clockwise, allowing the slot 69 in the primary latch to align itself with the slot 67 of the latch housing and freeing hasp 18 tentatively. When the key 57 is then turned to the right (FIG. 6) beyond the position of insertion 60, the secondary lever 64 is rotated to the right (clockwise) to fully release the striker 18, allowing the hood to be raised fully.

The latch housing is tilted into position through the back opening 23 of the bracket 20 back wall 22a and is suspended within the cup interior by mounting ears 70 secured to the back wall 22a. Release finger 74 extends up, beyond the turned-over flanges 34, 35, to resiliently receive and engage the striker support bracket 17 when the hood is closed. The female crank 71, contained in a sleeve 72 or snout of the latch mechanism, telescopes into the rear opening 73 of the lock to intermesh the male and female cranks. The telescoping is tight and flush, with no crevices between the rear flange 45, which overlaps the telescoping cranks to prevent tampering.

While the invention has been shown and described in its preferred embodiments, it will be clear to those skilled in the arts to which it pertains that many changes and modifications may be made thereto without departing from the scope of the invention.

I claim:

1. A tamper-proof vehicular compartment locking mechanism, the compartment having first and second closure members that come together in relatively close fitting relationship, comprising:

(a) a striker secured within the compartment to one closure member;

(b) a latch mechanism having a movable latch for catching and holding the striker when such striker is brought into a predetermined position relative to the other closure member;

(c) a bracket secured or connected to the other closure member having
      (i) walls secured to the latch mechanism for fixing such mechanism in a desired spatial position for receiving the striker,
      (ii) a saddle with spaced walls defining a track closed at one end by the saddle; and (d) a lock having a housing provided with
      (i) a tumbler body slidable in and along the track and nestable on the saddle for being secured in an operative position,
      (ii) housing flanges at opposite regions of the body that overlap the edges of both the spaced saddle walls, each flange contacting the edges of the side walls at one end of the body to ride thereon, fit flush thereagainst, and stabilize the body in said track, preventing said tumbler body from being pulled out or pushed in,
      (iii) a pair of ears extending from the body to fit flush with the interior of the respective track walls and prevent twisting of the body therein.

2. The mechanism as in claim 1, in which said latch housing is a unitary, cast piece having integral flanges and ears configured as plates with a thickness of at least 0.12 inches.

3. The mechanism as in claim 1, in which said saddle is U-shaped with flat, upright spaced walls, said ears being flat walls that slidingly fit against the interior of said flat walls.

4. The mechanism as in claim 1, in which said ears and side walls have openings for receiving fasteners to secure the lock against vibration when mounted.

5. A tamper-proof vehicular engine compartment hood latch and lock assembly, the compartment having a front grill panel and support, and a hood panel hinged about a horizontal axis just forward of the vehicular windshield for swinging down onto the front grill panel, the assembly comprising:

(a) a hasp secured to a forward underside position of the hood;

(b) a latch mechanism having a movable latch for catching and holding the hasp when such hasp is brought into a predetermined position relative to the front grill panel;

(c) a bracket depending from and secured to the support for said front grill panel, the bracket having (i) walls forming a cup holder for said latch mechanism with a slot in a front wall of the cup holder, (ii) securement for fixing the latch mechanism in such cup holder in a desired spatial position for receiving the hasp, (iii) an integral U-shaped saddle extending from said front wall of the cup holder with its axis transverse to such wall and aligned with the slot therein;

(d) a key operated lock having a housing provided with (i) a cylindrical tumbler body nestable in said U-shaped saddle with one end penetrating through said front grill panel for key access to the lock, said grill panel preventing raising and removal of the body from said saddle, (ii) spaced housing flanges extending transversely and radially away from the body to fit flush against opposite open sides of the saddle body, (iii) ears on said body aligned with said U-shaped saddle and extending tangentially from the opposite sides of the body to prevent rotation of the body relative to the saddle.

6. The assembly as in claim 5, in which said latch mechanism has a sleeve enclosing a shaft that actuates movement of the latch and said lock tumbler body having a sleeve enclosing an output crank, said sleeves telescoping into each other when said lock body and lock mechanism are assembled in said bracket.

7. The assembly as in claim 5, in which said slots or openings in said ears and U-shaped saddle receive a bolt to secure the lock body against vibration therein.

\* \* \* \* \*